US006664414B2

(12) United States Patent
Tong et al.

(10) Patent No.: US 6,664,414 B2
(45) Date of Patent: Dec. 16, 2003

(54) PROCESS FOR REDUCING RESIDUAL ISOCYANATE

(75) Inventors: Jiangdong Tong, London (CA); Ashok Sengupta, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/952,118

(22) Filed: Sep. 11, 2001

(65) Prior Publication Data

US 2003/0092932 A1 May 15, 2003

(51) Int. Cl.⁷ ..................... C07C 265/00; C07C 275/00
(52) U.S. Cl. ......................... 560/330; 560/335
(58) Field of Search ................... 560/330, 335

(56) References Cited

U.S. PATENT DOCUMENTS

| 3,183,112 A | | 5/1965 | Gemassmer |
| 3,248,372 A | | 4/1966 | Bunge |
| 3,384,624 A | | 5/1968 | Heiss |
| 3,627,722 A | | 12/1971 | Seiter |
| 3,632,557 A | | 1/1972 | Brode et al. |
| 3,856,756 A | * | 12/1974 | Wagner et al. |
| 3,883,577 A | | 5/1975 | Rabizzoni et al. |
| 3,992,316 A | | 11/1976 | Pedain et al. |
| 4,061,662 A | | 12/1977 | Marans et al. |
| 4,374,237 A | | 2/1983 | Berger et al. |
| 4,385,171 A | | 5/1983 | Schnabel et al. |
| 4,683,279 A | | 7/1987 | Milligan et al. |
| 5,051,152 A | | 9/1991 | Siuta et al. |
| 5,202,001 A | | 4/1993 | Starner et al. |
| 5,502,001 A | | 3/1996 | Okamoto |
| 5,880,167 A | | 3/1999 | Krebs et al. |
| 5,925,781 A | | 7/1999 | Pantone et al. |
| 6,121,354 A | | 9/2000 | Chronister |

OTHER PUBLICATIONS

Encyclopedia of Chemical Technology by Kirk and Othmer, 2nd Ed., vol. 12, pp. 46, 47, Interscience Pub. (1967).

* cited by examiner

*Primary Examiner*—Johann Richter
*Assistant Examiner*—Paul A. Zucker
(74) *Attorney, Agent, or Firm*—Michael E. Wheeler; Lucy C. Weiss

(57) ABSTRACT

The invention provides a process for reducing the amount of monomeric polyisocyanate in a composition comprising a polymer or oligomer bearing isocyanate groups, the method comprising reacting the composition with a quenching agent, the quenching agent comprising an arylalkyl alcohol and an alkoxysilane bearing a secondary amino group.

7 Claims, No Drawings

PROCESS FOR REDUCING RESIDUAL ISOCYANATE

FIELD OF THE INVENTION

This invention relates to a process for reducing residual monomeric polyisocyanate in a composition comprising a polymer or oligomer bearing isocyanate groups.

BACKGROUND OF THE INVENTION

Polyurethane prepolymers bearing isocyanate groups are commonly used in industry to make a wide variety of polyurethane products. These prepolymers are usually prepared by reacting a polyol with an excess of a monomeric polyisocyanate, for example, a diisocyanate. One of the diisocyanates extensively used industrially is tolylene diisocyanate (TDI). TDI-based prepolymers demonstrate lower viscosities compared to prepolymers formed with other diisocyanates, and are, therefore, particularly desirable.

Disadvantages associated with the process for forming these polyurethane prepolymers, particularly those TDI-based prepolymers, involve the unreacted TDI. For example, a relatively large amount (2–3 wt. %) of unreacted TDI is often present, and its high vapor pressure can lead to industrial hygiene issues.

Methods that have been developed to reduce the quantity of unreacted polyisocyanate contaminating various isocyanate prepolymers include falling film evaporation, wiped film evaporation, distillation, extraction using various solvents, or molecular sieves, or reaction with an organic reactive reagent such as benzyl alcohol. Most of these methods require, however, elevated temperature, reduced pressure, and/or multiple steps.

U.S. Pat. No. 4,061,662 discloses a process for removing unreacted TDI from an isocyanate prepolymer by contacting the prepolymer with molecular sieves. Additional processing steps require additional time to yield the desired prepolymer and increase the cost of the prepolymer.

U.S. Pat. Nos. 3,248,372; 3,384,624; and 3,883,577 describe processes related to removing free isocyanate monomers from prepolymers by solvent extraction techniques. Multiple steps are required in such processes.

It is also possible to distill an isocyanate prepolymer to remove the unreacted diisocyanate according to U.S. Pat. No. 4,385,171. However, it is necessary to use as a chaser a compound that is only partially miscible with the prepolymer and has a higher boiling point than that of the diisocyanate to be removed.

U.S. Pat. Nos. 3,183,112; 4,683,279; 5,051,152; and 5,202,001 describe falling film and/or wiped film evaporation. In U.S. Pat. No. 5,502,001, the residual TDI content can be reduced to less than 0.1 wt % by passing the prepolymer at ~100° C. through a wiped film evaporator, while adding an inert gas, a specially nitrogen, to the distillation process to sweep out the TDI.

It is known that isocyanate compounds react with organic compounds containing active hydrogen atoms such as hydroxy and amino groups. U.S. Pat. No. 3,384,624 disclosed benzyl alcohol as a suitable organic compound to remove excess of monomeric 2,4-TDI. The process requires elevated temperature (over 70° C. for at least 1 hour) and is not suitable for removing 2,6-TDI, which is usually a component of industrial grade TDI.

U.S. Pat. Nos. 3,627,722; 3,632,557; and 4,374,237 disclose silane-containing isocyanate-polyurethane polymers prepared by reacting isocyanate prepolymers with amino silanes. There were no reports of residual monomeric isocyanate compounds. This method was used to introduce additional cross-linking sites from alkoxy silane groups.

SUMMARY OF THE INVENTION

The invention provides a method of reducing the amount of unreacted polyisocyanate, for example, tolylene diisocyanate (TDI) from a polyurethane prepolymer bearing isocyanate groups.

The invention provides a process for reducing the amount of monomeric polyisocyanate in a composition comprising a polymer or oligomer bearing isocyanate groups, the process comprising reacting the composition with a quenching agent, the quenching agent comprising an arylalkyl alcohol and an alkoxysilane bearing a secondary amino group.

Surprisingly, in carrying out the process of the invention, it is generally not necessary to employ elevated temperatures.

DETAILED DESCRIPTION OF THE INVENTION

When an excess of a monomeric polyisocyanate is reacted with a polymer bearing active hydrogen groups, for example, a polyol bearing terminal hydroxyl groups, to form a polymer or oligomer bearing isocyanate groups, a substantial amount of unreacted polyisocyanate, which is toxic, can remain. The process of this invention minimizes the amount of unreacted monomeric polyisocyanate, and thereby reduces toxic risk.

The polymer or oligomer bearing isocyanate groups can be obtained by reacting a polymer bearing groups that are reactive to isocyanate groups, such as amino groups, alcohol groups, or thiol groups, or less preferably carboxyl groups, with an excess of polyisocyanate. The polymer or oligomer bearing isocyanate groups can be prepared, for example, by reacting a monomeric polyisocyanate with a copolymer of polyoxyethylene-propylene polyol using an NCO/OH equivalent ratio of about 5:1 to about 1.05:1, preferably a ratio of about 2.0:1 to 2.5:1. The preparation of isocyanate-terminated prepolymers is disclosed in, for instance, U.S. Pat. Nos. 4,315,703 and 4,476,276 and in references mentioned in those patents. The disclosures of these patents are incorporated herein by reference.

Monomeric polyisocyanates that can be used to prepare the polymer or oligomer bearing isocyanate groups include aliphatic and aromatic polyisocyanates. The preferred polyisocyanates are aromatic polyisocyanates. One of the most useful polyisocyanate compounds that can be used is tolylene diisocyanate, particularly as a blend of 80 weight percent of tolylene-2,4-isocyanate, and 20 weight percent of tolylene-2,6-isocyanate; a 65:35 blend of the 2,4- and 2,6-isomers is also particularly useful. These polyisocyanates are commercially available under the trademark "Hylene", as Nacconate™ 80, and as Mondur™ RD-80. The tolylene diisocyanates can also be used as a mixture with other monomeric polyisocyanates, for example, methylene diisocyanate. Other polyisocyanate compounds that can be used are other isomers of tolylene diisocyanate, hexamethylene-1,6-diisocyanate, diphenyl-methane-4,4'-diisocyanate, m- or p-phenylene diisocyanate and 1,5-naphthalene diisocyanate. Polymeric polyisocyanates can also be used, such as polymethylene polyphenyl polyisocyanates, such as those sold under the trademarks "Mondur" MRS, and "PAPI". A list of useful commercially available polyisocyanates is found in Encyclopedia of Chemical Technology by Kirk and Othmer, 2nd Ed., Vol. 12, pages 46, 47, Interscience Pub. (1967).

The invention is here described with reference to TDI as the monomeric polyisocyanate. It should be appreciated, however, that TDI is referred to as an example for the purpose of illustration only, and the invention is also applicable to quenching the amount of other monomeric polyisocyanates. The arylalkyl alcohol or the alkoxysilane that reacts with monomeric TDI desirably will not appreciably react with the terminal isocyanate groups of the polymer or oligomer. For example, TDI is normally used as a mixture of the 2,4- and 2,6-isomers, and the reactivities of the two isocyanate (—NCO) groups of monomeric TDI are different, i.e., the 4-position —NCO group is more reactive than the 2- or 6-position —NCO group. Consequently, reaction of a polyol with 2,4-TDI results in a polymer having terminal isocyanate groups derived mainly from the 2-position of 2,4-TDI, the 4-position —NCO group having been eliminated by reaction with the polyol. Residual 2,4-TDI still contains the more reactive 4-position —NCO group. An arylalkyl alcohol, such as benzyl alcohol can selectively react with the isocyanate group at the 4-position of free residual monomeric TDI with little reaction (usually less than 10%) with the less reactive terminal —NCO groups of the prepolymer, derived from the 2-position of TDI.

In a preferred embodiment, a mixture of residual monomeric 2,4- and 2,6-TDI present in a composition comprising a polymer bearing isocyanate groups is quenched with an arylalkyl alcohol used in conjunction with an alkoxysilane bearing a secondary amino group.

The arylalkyl alcohol is preferably a benzyl alcohol of formula (I):

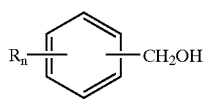

(I)

where R is hydrogen, an alkyl group, an aryl group, an alkylaryl group, an arylalkyl group, an alkoxy group or an aryloxy group, and n is an integer of from 1 to about 5. Examples of alkyl groups include methyl, ethyl, propyl, butyl, hexyl, octyl; preferred aryl groups include phenyl and naphythl; preferred arylalkyl groups include phenmethyl, phenethyl, phenpropyl, and phenbutyl; examples of alkylaryl groups also include cumenyl, mesityl, tolyl, and xylyl; and alkoxy groups include methoxy, ethoxy, butoxy, and propoxy.

Examples of the arylalkyl alcohol are benzyl alcohol, trimethyl benzyl alcohol, o-methyl benzyl alcohol, p-methyl benzyl alcohol, m-methyl benzyl alcohol, cuminol, o-ethyl benzyl alcohol, p-methoxy benzyl alcohol, 2,4-dimethoxy benzyl alcohol, and p-ethoxy benzyl alcohol. The arylalkyl alcohol is most preferably benzyl alcohol.

The alkoxysilane is preferably a compound of formula (II):

or a compound of formula (III):

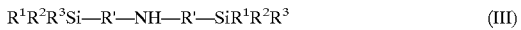

wherein each of $R^1$, $R^2$ and $R^3$ is independently an alkyl group or alkoxy group of up to 6 carbon atoms, an aryl group, an arylalkyl group, an aryloxy group, or an arylalkoxy group, wherein the alkyl or alkoxy group has up to about 10 carbon atoms, and wherein the aryl moiety is a phenyl or α- or β-naphthyl group, or a halogen atom (fluorine, chlorine, bromine or iodine), provided that at least one of $R^1$, $R^2$ and $R^3$ is a readily hydrolysable group such as an alkoxy or aryloxy group or a halogen atom; R' is a divalent hydrocarbon radical, optionally containing an O or —NH— group, having from 1 to about 20 carbon atoms; and R" is an alkyl group having from 1 to about 8 carbon atoms.

Suitable alkoxysilanes include N-(n-butyl) aminopropyltrimethoxysilane, N-methyl-3-aminopropyltrimethoxysilane, bis(trimethoxysilylpropyl)amine, or N-phenyl-gamma-aminopropyltrimethoxy silane.

Reaction of the mixture of the arylalkyl alcohol and alkoxysilane bearing a secondary amino group with residual monomeric polyisocyanate eliminates at least one of the isocyanate groups of the residual monomeric polyisocyanate. The number of isocyanate groups on the monomeric polyisocyanates is, therefore, effectively reduced by "quenching". To illustrate, a monomeric polyisocyanate is considered to be quenched if at least one of its isocyanate groups has been eliminated into a non-reactive species.

The amount of quenching agent used is chosen so that the maximum amount of monomeric polyisocyanate is effectively reduced by quenching, without significantly reducing the number of isocyanate groups on the polymer or oligomer. Such amounts can be determined by routine experimentation. The amount of the residual monomeric polyisocyanate that can remain after the quenching step is preferably 0, but may range up to about 0.50 wt. %.

In carrying out the process according to the present specification, it is generally not necessary to employ elevated temperatures.

The molar ratio of the arylalkyl alcohol to the alkoxysilane is preferably in the range of from about 1:1 to about 5:1.

The molar ratio of the mixture of arylalkyl alcohol and alkoxysilane to residual TDI is preferably in the range of from about 1.0 to about 2.5, more preferably from about 1.5 to about 2.0.

An alkoxysilane bearing a mono secondary amino group, for example, bis(trimethoxysilylpropyl)amine (Silquest™ A-1170 from Osi Co.), can catalyze the reaction of arylalkyl alcohols with isocyanate groups. Alternatively, the alkoxysilane can act as a nucleophile. In the event, that the alkoxysilane reacts with a terminal —NCO group of the polymer or oligomer, it will introduce a reactive silyl group, for example a —Si(OMe)₃ to compensate for the loss of the —NCO group. Since bulky alkoxysilanes react relatively slowly with —NCO groups, their lifetime as a catalyst can be prolonged.

The use of the alkoxysilane as a catalyst does not result in side reactions that can occur when a tertiary amine is used as a catalyst. For example, the tertiary amine can trigger internal cross-linking reactions which can lead to an increase of the viscosity of the polymer with time. The use of an alkoxysilane as catalyst is advantageous in that it can act as a reactant, and effectively removed from the reaction mixture.

Objects and advantages of this invention are further illustrated by the following examples, but the particular materials and amounts thereof recited in these examples, as well as other conditions and details, should not be construed to unduly limit this invention.

EXAMPLES

Materials:

A prepolymer (prepolymer A) bearing isocyanate groups was prepared from a trifunctional polyol (a copolymer of propylene oxide and ethylene oxide, poly™ 83–84 from Arch Chemicals) and TDI (Mondur™ TD-80 from Bayer USA) at 1:2.352 equivalent ratio (10.5 wt % TDI charged). The prepolymer is an intermediate product from 3M containing 1.8–2.0 wt. % residual TDI and 2.8–3.2 wt. % isocyanate groups. The residual TDI is usually a mixture of 60–70% 2,6-TDI and 30–40% 2,4-TDI, as determined by NMR. The benzyl alcohol and secondary amines were from Aldrich and the secondary amino alkoxysilanes were industrial samples.

Analysis of Residual Free TDI:

The isocyanate content in the prepolymer was determined by titrating the prepolymer with n-butyl amine. The molar ratio of residual TDI to total charged TDI was obtained from $^1$H-NMR analysis conducted on a 600 MHz Varian NMR instrument at the University of Western Ontario.

The weight percentage of residual TDI in the prepolymer was calculated according to the TDI charge ratio and residual TDI molar ratio.

General Procedure to Reduce TDI Content in Isocyanate Prepolymers

To a 3-neck 250 ml round-bottom flask equipped with a mechanical stirrer and purged with dry nitrogen was added 200 g of isocyanate prepolymer. An active hydrogen-containing compound (as shown in Comparative Examples 1–7), or a mixture of benzyl alcohol and amino alkoxy silane (Examples 1–4) was added dropwise to the prepolymer while stirring (300–600 rpm). The reaction mixture was collected after 2–4 hr.

Comparative Examples 1–7

In Comparative Examples 1–3, prepolymer A was reacted with the aliphatic secondary amine bis(2-ethyl hexyl) amine (BEHA), the aromatic secondary amine N-ethyl aniline (NEA), and the secondary amino aloxysilane, bis[(3-trimethoxysilyl)propyl]amine (A-1170), using a molar ratio of reactant to TDI of 1.1.

In Comparative Examples 4 and 5, prepolymer A was reacted with 1.1 or 1.6 equivalents of BA, with respect to the amount of residual TDI, at 70–85° C. NMR analysis indicated that only 45–55% of the BA has been reacted with the isocyanate groups, most of which are from 2,4-TDI. The residual TDI content in these cases remained high after 2 h at 85° C. possibly due to the low reactivity of BA with 2,6-TDI.

In Comparative Examples 6 and 7, prepolymer A was reacted with BA at room temperature with 0.15 wt. % TEA.

TABLE 1

Quenching of Unreacted TDI by Active Hydrogen Containing Compounds[1]

| Example | Reactant[2] | Residual TDI Before Reaction Wt. % | Residual TDI Before Reaction Mol % | Molar Ratio of Reactant to Residual TDI | Mol % reacted reactant | Residual TDI after Reaction Wt. % | Residual TDI after Reaction Mol % | Mol % Residual TDI Quenched | Percentage of Residual TDI Quenched | Efficiency of TDI Quenching[3] |
|---|---|---|---|---|---|---|---|---|---|---|
| C-1 | BEHA | 1.82 | 16.2 | 1.1 | 17.8 | 1.03 | 9.2 | 7.0 | 43.2 | 39.3 |
| C-2 | NEA | 1.82 | 16.2 | 1.1 | 17.8 | 0.76 | 6.8 | 9.4 | 58.0 | 52.8 |
| C-3 | A-1170 | 1.82 | 16.2 | 1.1 | 17.8 | 0.65 | 5.8 | 10.4 | 64.2 | 58.4 |
| C-4 | BA[4] | 1.82 | 16.2 | 1.6 | 11.9 | 0.92 | 8.2 | 8.0 | 49.4 | 67.2 |
| C-5 | BA[5] | 1.82 | 16.2 | 1.1 | 9.8 | 1.08 | 9.6 | 6.6 | 40.7 | 67.3 |
| C-6 | BA/TEA[6] | 1.97 | 17.6 | 0.94 | 16.5 | 0.52 | 4.6 | 13 | 73.9 | 78.8 |
| C-7 | BA/TEA[6] | 1.97 | 17.6 | 1.25 | 22.0 | 0.34 | 3.0 | 14.6 | 83.0 | 66.4 |

[1]Reaction condictions unless otherwise indicated quenching reaction conducted at 25° C. for 2 hours.
[2]BA is benzyl alcohol; BEHA is bis(2-ethyl hexyl) amine; NEA is N-ethyl aniline; A-1170 is bis[(3-trimethoxysilyl)propyl]amine, TEA is triethylamine.
[3] Percent Efficiency = (mol % TDI removed / mol % reacted reactant) * 100
[4] Quenching reaction conducted 70° C. for 2 h.
[5] Quenching reaction conducted 85° C. for 2 h.
[6]TEA 0.15 wt. % of prepolymer.

Example 1

Prepolymer was first reacted with BA at 85° C. for 2 h, cooled to room temperature, and then reacted with A-1170 at room temperature for 2 h. NMR analysis revealed that only 55% BA reacted after 2 h at 85° C., while completely reacted after 2 h of A-1170's addition.

Examples 2–5

Prepolymer A was reacted with a mixture of BA and A-1170 at room temperature. The total BA and A-1170 equivalent was fixed at 1.86 with respect to the residual TDI. The reactions were carried out for 4 hr at RT and the products were stored under RT under argon atmosphere.

TABLE 2

Quenching of free TDI by a mixture of benzyl alcohol and A-1170.

| Example | Residual TDI Before Reaction Wt. % | Residual TDI Before Reaction Mol %[#] | Mol % of Active NCO in Prepolymer Before Quenching Reaction* | Molar ratio of Reactants to Residual TDI | Residual TDI After Quenching Reaction Wt. % | Residual TDI After Quenching Reaction Mol.%[#] | Reaction temp. (° C.) | Mol % of Active NCO in Prepolymer After Quenching Reaction* | % -NCO In Prepolymer Quenched During Reaction* |
|---|---|---|---|---|---|---|---|---|---|
| 2 | 1.82 | 16.2 | 57.4 | 1.1 (BA) 1.1 (A-1170) | 0.27 | 2.4 | 85 and 25 | 46.0 | 20 |
| 3 | 1.97 | 17.6 | 57.6 | 0.94 (BA) 0.94 (A-1170) | 0.21 | 1.9 | 25 | 47.9 | 17 |
| 4 | 1.97 | 17.6 | 57.6 | 1.25 (BA) 0.63 (A-1170) | 0.24 | 2.1 | 25 | 49.5 | 14 |
| 5 | 1.97 | 17.6 | 57.6 | 1.57 (BA) 0.31 (A-1170) | 0.41 | 3.7 | 25 | 52.9 | 8 |

*Values relate to only 2,4-TDI, which reacted at 4-position with polyols.
[#]Mol % is the residual TDI / Total TDI charged × 100%.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A process for reducing the amount of monomeric polyisocyanate in a composition comprising a polymer or oligomer bearing isocyanate groups, the method comprising reacting the composition with a quenching agent, the quenching agent comprising an arylalkyl alcohol and an alkoxysilane bearing one secondary amino group.

2. A process according to claim 1, wherein the arylalkyl alcohol is a benzyl alcohol of formula (I):

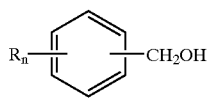
(I)

where R is hydrogen, an alkyl group, an aryl group, an alkylaryl group, an arylalkyl group, an alkoxy group or an aryloxy group, and n is an integer of from 1 to about 5.

3. A process according to claim 1, wherein the arylalkyl alcohol is benzyl alcohol, trimethyl benzyl alcohol, o-methyl benzyl alcohol, p-methyl benzyl alcohol, m-methyl benzyl alcohol, cuminol, o-ethyl benzyl alcohol, p-methoxy benzyl alcohol, 2,4-dimethoxy benzyl alcohol, or p-ethoxy benzyl alcohol.

4. A process according to claim 1, wherein the arylalkyl alcohol is benzyl alcohol.

5. A process according to claim 1, wherein the alkoxysilane is a compound of formula (II):

$$R^1R^2R^3Si-R'-NHR''\qquad(II)$$

or a compound of formula (III):

$$R^1R^2R^3Si-R'-NH-R'-SiR^1R^2R^3\qquad(III)$$

wherein each of $R^1$, $R^2$ and $R^3$ is an alkyl group or alkoxy group; an aryl group, an arylalkyl group, an aryloxy group, or an arylalkoxy group, or a halogen atom, provided that at least one of $R^1$, $R^2$ and $R^3$ is a readily hydrolysable group; R' is a divalent hydrocarbon radical, optionally containing an O, having from 1 to about 20 carbon atoms; and R" is an alkyl group having from 1 in about 8 carbon atoms.

6. A process according to claim 1, wherein the alkoxysilane is N-(n-butyl) aminopropyltrimethoxysilane, N-methyl-3-aminopropyltrimethoxysilane, bis(trimethoxysilypropyl) amine, or N-phenyl-gamma-aminopropyltrimethoxy silane.

7. A process according to claim 1, wherein the monomeric polyisocyanate is a mixture of 2,4 tolylene diisocyanate and 2,6 tolylene diisocyanate.

* * * * *

UNITED STATES PATENT AND TRADEMARK OFFICE
CERTIFICATE OF CORRECTION

| | |
|---|---|
| PATENT NO. | : 6,664,414 B2 |
| APPLICATION NO. | : 09/952118 |
| DATED | : December 16, 2003 |
| INVENTOR(S) | : Tong et al. |

Page 1 of 1

It is certified that error appears in the above-identified patent and that said Letters Patent is hereby corrected as shown below:

<u>Column 3</u>
Line 20, insert paragraph indentation after "isocyanates".

<u>Column 5</u>
Line 17, delete "poly$^{TM}$" and insert -- polyG $^{TM}$ --

<u>Column 8</u>
Line 47, delete "in" and insert -- to --

Signed and Sealed this

Eleventh Day of July, 2006

JON W. DUDAS
*Director of the United States Patent and Trademark Office*